US007059887B1

(12) United States Patent
Liu

(10) Patent No.: US 7,059,887 B1
(45) Date of Patent: Jun. 13, 2006

(54) OPTOELECTRIC MODULE WITH POP-OUT TAB BASED LATCHING/DELATCHING MECHANISM

(76) Inventor: Eric Liu, 20177 Hogue Ct., Cupertino, CA (US) 95014

( * ) Notice: Subject to any disclaimer, the term of this patent is extended or adjusted under 35 U.S.C. 154(b) by 0 days.

(21) Appl. No.: 10/770,265

(22) Filed: Feb. 2, 2004

Related U.S. Application Data

(60) Provisional application No. 60/444,472, filed on Feb. 3, 2003.

(51) Int. Cl.
*H01R 13/62* (2006.01)
*G02B 6/00* (2006.01)

(52) U.S. Cl. ....................................... 439/372; 385/136

(58) Field of Classification Search ................ 439/372, 439/358, 368, 370; 385/53, 92, 136, 76, 385/88, 134
See application file for complete search history.

(56) References Cited

U.S. PATENT DOCUMENTS 6,746,158 B1 * 6/2004 Merrick ....................... 385/53
6,811,317 B1 * 11/2004 Chiu et al. .................... 385/53
6,830,385 B1 * 12/2004 Ishigami et al. .............. 385/92
6,851,867 B1 * 2/2005 Pang et al. ................... 385/88
2004/0240801 A1 * 12/2004 Malagrino et al. ............ 385/92

* cited by examiner

*Primary Examiner*—Chandrika Prasad
(74) *Attorney, Agent, or Firm*—Parsons & Goltry; Robert A. Parsons; Michael W. Goltry

(57) ABSTRACT

An optoelectric module includes a housing having a front face with an opening designed to receive an optical transceiver nestingly engaged therein. The optoelectric module includes a discontinuity in an outer surface positioned to cooperate with a spring latch formed in an inner surface of the cage to latch the module in a fully nested orientation within the cage. An actuator is mounted on an outer surface of the housing and movable from an orientation in which the housing is latched in the cage to an orientation in which the actuator engages the spring latch and disengages it from the discontinuity. A bail latch is pivotally mounted for movement between a stored position and a module removal position and is engaged with the actuator to move from the stored position to the module removal position with movement of the actuator from the latched orientation to the delatched orientation.

7 Claims, 3 Drawing Sheets

OPTOELECTRIC MODULE WITH POP-OUT TAB BASED LATCHING/DELATCHING MECHANISM

CROSS-REFERENCE TO RELATED APPLICATIONS

This application claims the benefit of U.S. Provisional Application No. 60/444,472, filed 3 Feb. 2003.

FIELD OF THE INVENTION

This invention relates to transceiver packages and, more particularly, to a latching and delatching apparatus for transceiver packages.

BACKGROUND OF THE INVENTION

At the present time, optical-to-electrical and electrical-to-optical (hereinafter "optoelectric") packages, containing a pair of optoelectric packages, are contained in one common or standard optoelectric module. The packages are generally used in pairs for two-way communication. Multiple optoelectric modules are used in a common mounting rack to provide multiple communication channels. The optoelectric modules are positioned in the rack in, for example, rows and columns and, to save space, the optoelectric modules are positioned as close together as possible.

In general, each optoelectric module is constructed to be inserted into an opening or cage in the rack. Once the optoelectric module is inserted completely into the cage, the optoelectric module is captured by means of a latch spring inside the cage that is positioned to engage a locking tab on the optoelectric module. To release the optoelectric module and remove it from the cage, the latch spring must be disengaged from the locking tab, after which the optoelectric module can be withdrawn from the cage.

The problems that arise result chiefly from the closeness, size and shape of the optoelectric modules. The optoelectric modules are generally oblong in shape with a multi-pin electrical plug or socket at the rear or inner end which mates with a multi-pin electrical socket or plug in the cage. The optoelectric module must nest snugly in the cage since any relative movement would eventually cause failures. However, because of the firm fit, withdrawal of the optoelectric module from the cage requires some effort. Because of the closeness and small size of the multiple optoelectric modules in the rack, access to each optoelectric module is limited. Also, the latch spring must be disengaged from the locking tab before the optoelectric module can be withdrawn.

In one prior art solution a simple linear actuator is provided. The linear actuator is pushed forward to raise the latch spring in the cage to release it from the locking tab. For this design, the linear actuator is entirely located under the optoelectric module and, therefore, is difficult to access. That is, one must push the linear actuator forward with one hand to raise the latch spring and then grip and pull the optoelectric module. This combined pushing and pulling action, along with the need to firmly grip whatever portion of the optoelectric module is available for gripping, is very inconvenient.

Another solution used in the prior art uses a locking tab on the end of a lever spring. This, solution requires a different rack and cage arrangement. Instead of moving the latch spring (as described above) in the cage, the locking tab is displaced to clear the latch and unlock the optoelectric module. A problem is that latch springs can be unreliable. For example, the spring can be bent or deformed by repeated use and will no longer effectively lock the optoelectric module into the cage.

Another solution is the handle-based design. A handle is pulled down to release the latch. This handle can then be used to pull the module out of the cage. He problem with this solution is reaching the handle in the first place. In high density module arrangements, it can be very difficult to reach the handle as there may be another module right above it.

It would be highly advantageous, therefore, to remedy the foregoing and other deficiencies inherent in the prior art.

Another object of the present invention is to provide a new and improved optoelectric module with pop-out tab based latching/delatching mechanism.

Another object of the present invention is to provide a new and improved optoelectric module with pop-out tab based latching/delatching mechanism that can be easily incorporated into any of the present optoelectric modules and cages.

Another object of the present invention is to provide a new and improved optoelectric module with pop-out tab based latching/delatching mechanism that provides greater accessibility during nesting and removal of optical transceivers from cages.

SUMMARY OF THE INVENTION

Briefly, to achieve the desired objects of the instant invention in accordance with a preferred embodiment thereof, an optoelectric module with pop-out tab based latching/delatching mechanism is provided. The optoelectric module includes a housing having a front face with an opening and designed to receive an optical transceiver nestingly engaged in the opening in the housing. The optoelectric module is designed to cooperate with a spring latch positioned to latch the module nestingly in a cage. An actuator is mounted on an outer surface of the housing and movable from a latched orientation in which the housing is latched in the cage to a delatched orientation in which the actuator engages the spring latch to move the spring latch to a delatched position. A bail latch is pivotally mounted on the module for movement between a stored position and a module removal position. The bail latch is engaged with the actuator so as to move from the stored position to the module removal position with movement of the actuator from the latched orientation to the delatched orientation.

The desired objects of the instant invention are further realized in a specific embodiment of an optoelectric module with pop-out tab based latching/delatching mechanism. This embodiment includes an optoelectric module including a housing having a front face with an opening and designed to receive an optical transceiver nestingly engaged in the opening in the housing. The optoelectric module includes a discontinuity formed in an outer surface and positioned to cooperate with a spring latch formed in an inner surface of the cage to latch the module in a fully nested orientation within the cage. An actuator is mounted on an outer surface of the housing by an actuator mount and is movable from a latched orientation in which the housing is latched in the cage to a delatched orientation in which the actuator engages the spring latch to disengage the spring latch from the discontinuity. A bail latch is pivotally mounted on either the actuator or the actuator mount for movement between a stored position and a module removal position. The bail latch is engaged with the actuator so as to move from the stored position to the module removal position with movement of the actuator from the latched orientation to the delatched orientation. The bail latch can optionally move the actuator when it is pivoted or the actuator can move the bail latch when it is pushed into the housing.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF THE DRAWINGS

Figure 1:
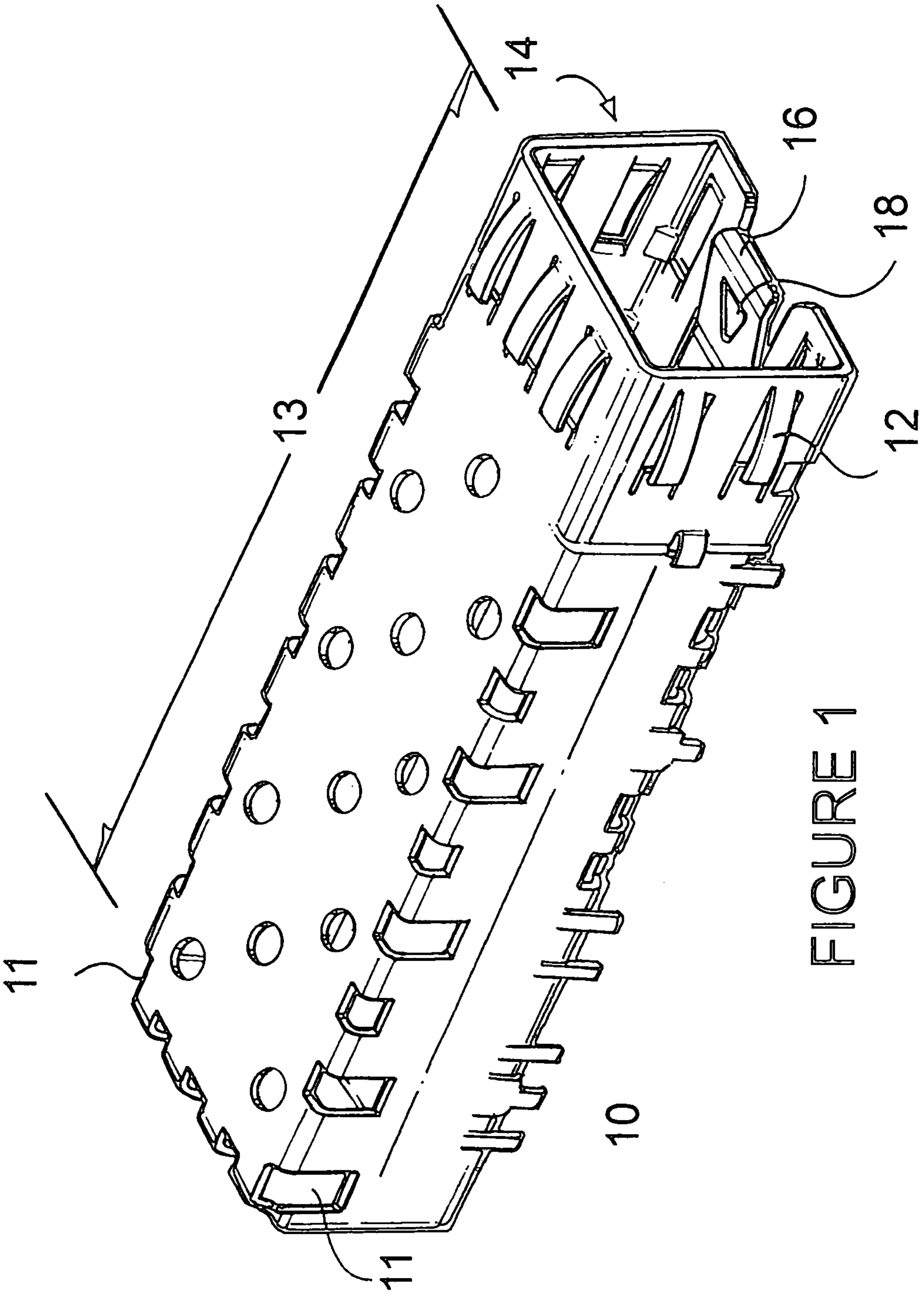
FIG. 1 is a perspective view of an optoelectric cage used in conjunction with the optoelectric module of the present invention.

Turning now to FIG. 1, an optoelectric cage 10 is illustrated. In a preferred embodiment, optoelectric cage 10 is designed to hold an optoelectric module 20 (See FIG. 2) which slides into an opening 14. In the preferred embodiment, optoelectric module 20 can be slid rearwardly a distance 13 as determined by tabs 11. Spring fingers 12 are positioned on cage 10 to hold optoelectric module 20 firmly in place, as will be discussed presently. The latching mechanism of cage 10 includes an upwardly or inwardly slanted spring finger or spring latch 16 in the lower surface with a triangular opening 18 therein. This latches onto a triangular protrusion or latch (see FIG. 7) on the bottom of module 20 when module 20 is fully nested into cage 10. Further, it will be understood that cage 10 is typically included in an array of adjacent cages. However, only one cage is illustrated for simplicity and ease of understanding.

Figure 2:
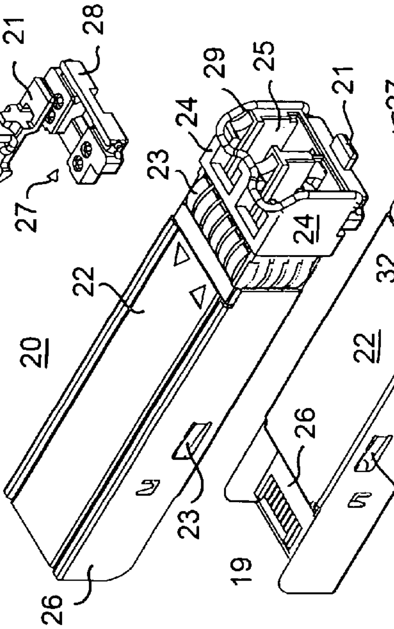
FIG. 2 is a top perspective view of an optoelectric module in accordance with the present invention.

Turn now to FIG. 2 which illustrates an optoelectric module 20. In a preferred embodiment, module 20 includes an elongated housing 22 with a rear end 26 which makes contact with tabs 11 when module 20 is inserted into cage 10 through opening 14. In the preferred embodiment, housing 20 includes a header 24, which is typically formed of a single piece and may be manufactured by some convenient means, such as molding or the like. In general, header 24 is mated with the elongated portion of housing 22 and includes a pair of openings 25 designed to house an optical receiver package and an optical transmitter package (not shown).

In this embodiment, elongated housing 22 is formed of metal and includes detents 23 positioned to frictionally engage an inner surface of cage 10, such as spring fingers 12 (See FIG. 1). Module 20 includes detents 23 which engage spring fingers 12 so that module 20 is held firmly within cage 10 to minimize vibrations and other such movement which can affect the performance and alignment of module 20. Hence, detents 23 ensure a positive contact between optoelectric module 20 and cage 10 to prevent relative movement once optoelectric module 20 is properly nested in cage 10 and also ensure that cage 10 and optoelectric module 20 are electrically connected. Spring fingers 12 and detents 23 electrically ground module 20 to cage 10 in order to block electromagnetic emissions (EMI).

Figure 3:
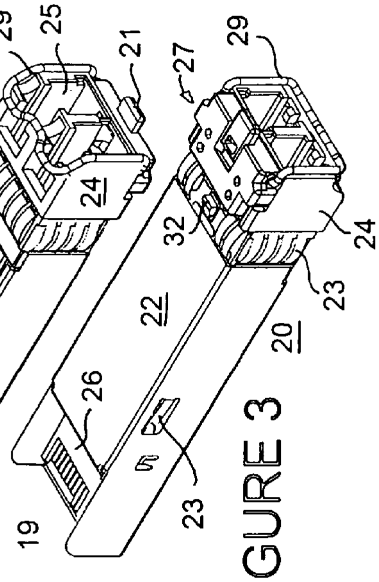
FIG. 3 is a bottom perspective view of the optoelectric module illustrated in FIG. 2.

Optoelectric module 20 has either a plug or socket of a multi-pin electrical connector 19 at the rear end (see FIG. 3), which plug or socket is positioned to mate with a socket or plug in the mounting rack when optoelectric module 20 is properly nested in cage 10 of the mounting rack. In this embodiment, it is anticipated that each transmitter and receiver package includes a printed circuit board with multiple contacts formed on a rearwardly extending surface. Each of the transmitter and receiver packages electrically connects to the multi-pin electrical connector 19 at the rear end of elongated housing 22 when the packages are properly inserted into openings 25.

Figure 4:
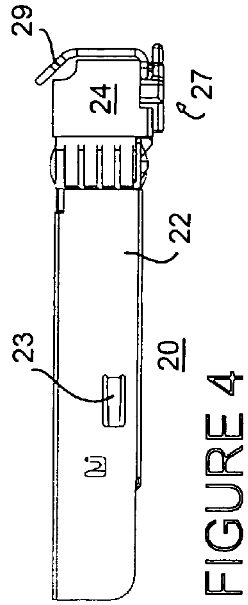
FIG. 4 is a side view of the optoelectric module illustrated in FIG. 2.
Figure 6:
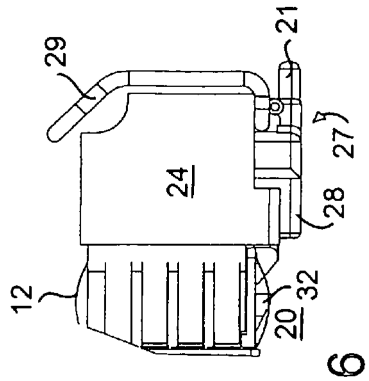
FIG. 6 is an enlarged partial side view of the optoelectric module further illustrating the latching/delatching mechanism.
Figure 5:
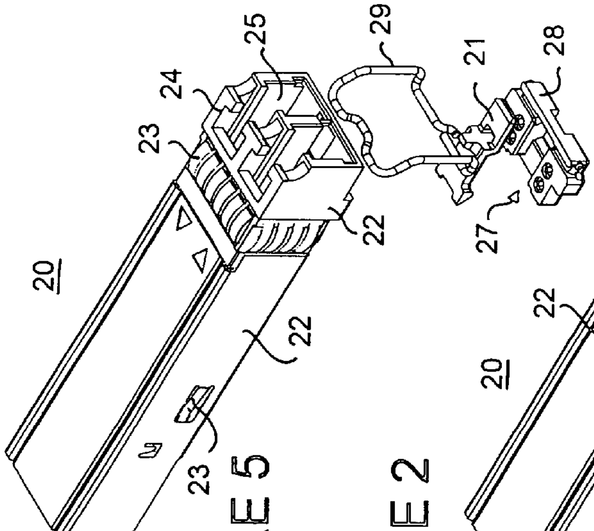
FIG. 5 is a top perspective view of the optoelectric module with exploded latching/delatching mechansim.
Figure 8:
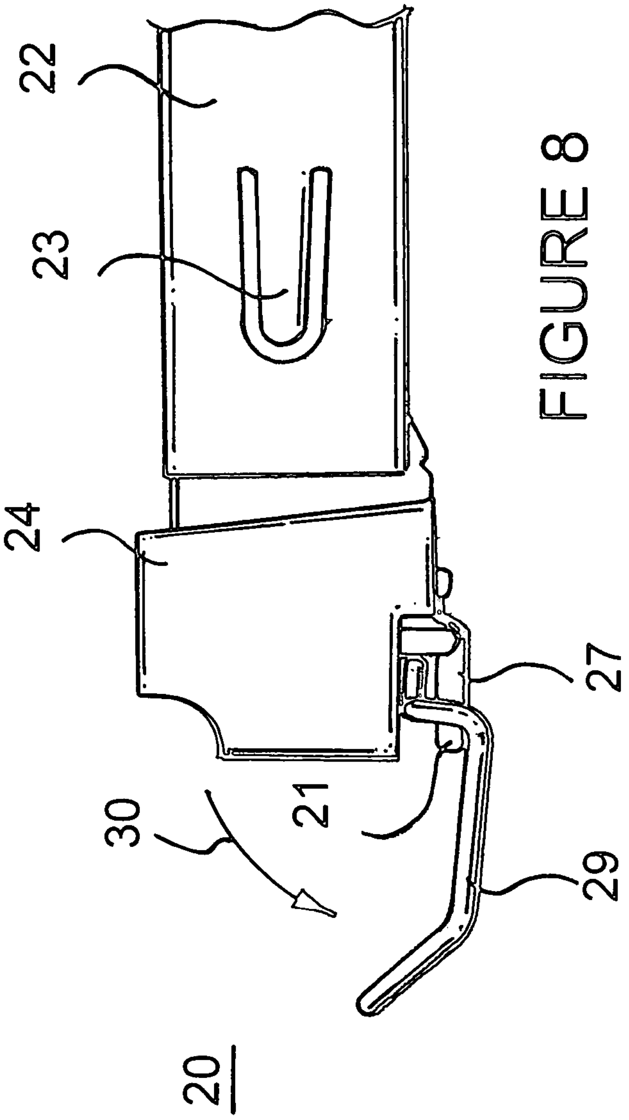
FIG. 8 is an enlarged side view of the optoelectric module illustrated in FIG. 7, with the actuator mount removed to better illustrate the latching/delatching mechanism and illustrating the mechanism in a delatched orientation.

A pop-out tab-based latching/delatching mechanism 27 is attached to elongated housing 22 and header 24 in accordance with the present invention. In this embodiment, pop-out tab-based delatching mechanism 27 is formed as a separate assembly (see FIG. 5) and attached to header 24 during a final assembly using pins, however, it could be formed as an integral part or otherwise attached thereto. In this embodiment, latching/delatching mechanism 27 includes a generally U-shaped metal handle or bail latch 29, which is sturdy and easy to form, an actuator mount 28, and an actuator or pop-out tab 21. Bail latch 29 is pivotally mounted at each end in the sides of actuator mount 28 for movement between a closed position, illustrated in FIGS. 4 and 6, and an open position, illustrated in FIG. 8. To move bail latch 29 from the closed or latched position to the open or delatched position, pop-out tab 21 is pushed inwardly to release module 20 from cage 10. As pop-out tab 21 moves inwardly, bail latch 29 is pivoted downwardly in a direction 30 as illustrated in FIG. 8.

Figure 7:
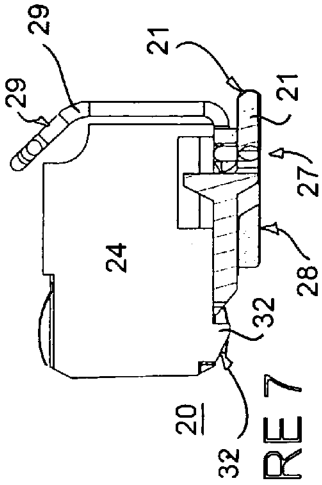
FIG. 7 is an enlarged partial sectional view of the optoelectric module further illustrating the latching/delatching mechanism.

Pop-out tab 21 is constructed in this embodiment as a simple see-saw lever wherein bail latch 29 is pivoted in direction 30 to be easily accessible with a finger when pop-out tab 21 is pushed inwardly towards header 24. Pop-out tab 21, in a different embodiment, can also raise a latching spring (not shown) in the lower surface of module 20 as it is pushed in, to delatch the latching spring from engagement with an opening or discontinuity in the bottom of cage 10. Or, conversely, pop-out tab 21 lowers spring finger 16 in inner surface of cage 10 from engagement with an opening or discontinuity 32 in the lower surface of header 24 of module 10. However, it will be understood that pop-out tab 21 can include other types of levers well known to those skilled in the art. In the embodiment illustrated in FIGS. 7 and 8, bail latch 29 is pivotally mounted in actuator 21 and the module is delatched by pushing pop-out tab 21 inwardly. As actuator or pop-out tab 21 is moved inwardly, the sloping rear surface engages spring latch 16 to force it downwardly and disengage it from discontinuity 32, as can be seen in FIG. 7. Also, pushing actuator 21 in rotates or pivots bail latch 29 downwardly for easy griping and removal of module 20 from cage 10. While different connections or arrangements of actuator 21 and bail latch 29 are illustrated, it will be understood that other modifications may be devised.

Pop-out tab 21 and bail latch 29 make it easier to delatch and remove module 20 from cage 10 when it is positioned within an array of optoelectric modules wherein it is difficult to delatch and remove because of the closeness of module 20 to adjacent modules in an array of modules. Pop-out tab-based delatching mechanism 27 can then be used to easily withdraw module 30 from opening 14.

While a pop-out tab-based delatching mechanism is illustrated in conjunction with a specific optoelectric module 20, it will be understood that it may be used with other optoelectric packages and may be incorporated as an integral portion or added during assembly. Also, while a specific pop-out tab-based delatching mechanism 27 is illustrated and described, it will be understood that other embodiments may be devised which essentially perform the same functions.

Thus, pop-out tab-based delatching mechanism 27 improves the delatching feature because mechanism 27 is in an unobstructed position and accessibility is greatly increased. The pop-out tab allows the pop-out tab-based latching/delatching mechanism to be used in high port density applications. Also, mechanism 27 is formed of sturdy and reliable material which greatly increases the life and reliability of the optoelectric module. Mechanism 27 not only allows the delatching of optoelectric package 20 but provides a convenient sturdy grip for the removal of optoelectric package 20 from cage 10, once the pop-out tab is operated so that packing density is no longer a substantial problem.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. An optoelectric module with pop-out tab based latching/delatching mechanism comprising:

an optoelectric module including a housing having a front face with an opening and designed to receive an optical transceiver nestingly engaged in the opening in the housing, the optoelectric module being designed to cooperate with a spring latch positioned to latch the module nestingly in a cage;

an actuator mounted on an outer surface of the housing and movable from a latched orientation in which the housing is latched in the cage to a delatched orientation in which the actuator engages the spring latch to move the spring latch to a delatched position; and a bail latch pivotally mounted on the module for movement between a stored position and a module removal position, the bail latch being engaged with the actuator so as to move from the stored position to the module removal position with movement of the actuator from the latched orientation to the delatched orientation.

2. An optoelectric module with pop-out tab based latching/delatching mechanism as claimed in claim 1 wherein the actuator is mounted in an actuator mount affixed to an outer surface of the module housing, the actuator is mounted in the actuator mount for horizontal movements in response to a force applied to an outwardly extending end surface of the actuator.

3. An optoelectric module with pop-out tab based latching/delatching mechanism as claimed in claim 2 wherein the actuator is mounted in an actuator mount affixed to an outer surface of the module housing and the bail latch is pivotally mounted on the actuator, the optoelectric module having a front face and the actuator is mounted in the actuator mount so as to extend forward beyond the front face of the optoelectric module to form a pop-out tab for horizontal movement.

4. An optoelectric module with pop-out tab based latching/delatching mechanism as claimed in claim 1 wherein the actuator is mounted in an actuator mount affixed to an outer surface of the module housing and the bail latch is pivotally mounted on the actuator mount and in mechanical engagement with the actuator, the actuator is mounted in the actuator mount for horizontal movement in response to a force applied to an outwardly extending end surface of the actuator and the horizontal movement produces a pivotal movement of the bail latch from the stored position to the module removal position.

5. An optoelectric module with pop-out tab based latching/delatching mechanism as claimed in claim 1 wherein the bail latch is formed of metal.

6. An optoelectric module with pop-out tab based latching/delatching mechanism as claimed in claim 5 wherein the bail latch is formed in a generally U-shape with legs and a connecting bight, ends of the legs being engaged in opposed openings to pivotally mount the bail latch and the bight providing a handle for withdrawing the module from the cage.

7. An optoelectric module with pop-out tab based latching/delatching mechanism comprising:

an optoelectric module including a housing having a front face with an opening and designed to receive an optical transceiver nestingly engaged in the opening in the housing, the optoelectric module including a discontinuity formed in an outer surface and positioned to cooperate with a spring latch formed in an inner surface of the cage to latch the module in a fully nested orientation within a cage;

an actuator mounted on an outer surface of the housing by an actuator mount so as to extend forward beyond the front face of the optoelectric module to form a horizontally movable pop-out tab, the pop-out tab being horizontally movable from a latched orientation in which the housing is latched in the cage to a delatched orientation in which the actuator engages the spring latch to disengage the spring latch from the discontinuity; and a bail latch pivotally mounted on one of the actuator and the actuator mount for movement between a stored position and a module removal position, the bail latch being engaged with the actuator so as to move from the stored position to the module removal position with movement of the actuator from the latched orientation to the delatched orientation.

* * * * *